United States Patent [19]

Hoeck

[11] Patent Number: 6,097,013
[45] Date of Patent: Aug. 1, 2000

[54] METHOD OF SOFT-COOKING AN EGG

[75] Inventor: Horst Hoeck, Aachen, Germany

[73] Assignee: GNT Gesellschaft fur Nahrungsmittel-Technologie mbH, Aachen, Germany

[21] Appl. No.: 09/388,668

[22] Filed: Sep. 2, 1999

[30] Foreign Application Priority Data

Sep. 25, 1998 [EP] European Pat. Off. .............. 98118208

[51] Int. Cl.[7] ................................ H05B 6/12; H05B 6/40
[52] U.S. Cl. ......................... 219/620; 219/622; 219/652; 219/624; 219/672; 426/237; 426/243; 426/523; 99/DIG. 14; 99/451
[58] Field of Search .................... 219/620, 622, 219/624, 672, 652, 647, 671; 426/237, 241, 243, 234, 520, 523; 99/DIG. 14, 451

[56] References Cited

U.S. PATENT DOCUMENTS

| | | |
|---|---|---|
| 2,471,041 | 6/1949 | Urbain et al. ........................... 219/771 |
| 3,786,222 | 1/1974 | Harnden, Jr. et al. ................... 219/624 |
| 3,830,945 | 8/1974 | Scharfman .............................. 426/243 |
| 3,843,813 | 10/1974 | Driggs ..................................... 426/241 |
| 5,612,076 | 3/1997 | Samimi . |

FOREIGN PATENT DOCUMENTS

| | | |
|---|---|---|
| 0497099 | 8/1992 | European Pat. Off. . |
| 2950384 | 6/1981 | Germany . |
| 90 857 032 | 6/1992 | U.S.S.R. . |
| WO 95/26636 | 10/1995 | WIPO . |

*Primary Examiner*—Philip H. Leung
*Attorney, Agent, or Firm*—Herbert Dubno; Andrew Wilford

[57] ABSTRACT

A raw egg is cooked by orienting the egg adjacent a field coil and electrically energizing the field coil with a high-frequency alternating electric current so as to inductive heating the egg. The field coil operates at between 1 MHz and 1000 MHz, preferably between 10 MHz and 50 MHz, and generates a field having parallel lines passing through the egg. The coil and egg are relatively rotated, normally by holding the coil stationary and rotating the egg, while electrically energizing the field coil. To this end the field coil has a pair of halves connected in series and flanking the egg.

16 Claims, 3 Drawing Sheets

METHOD OF SOFT-COOKING AN EGG

FIELD OF THE INVENTION

The present invention relates to cooking an egg. More particularly this invention concerns a method of soft-cooking an egg in the shell.

BACKGROUND OF THE INVENTION

An egg is typically soft-cooked in the shell by boiling it for several minutes, three for a very soft egg, ten for a hard egg. A properly cooked soft-boiled egg has a cooked and firm white surrounding a warm but still liquid yoke. If the white or albumen is soft and runny or if the yoke is firm or hard the egg is not acceptable.

In preparing such eggs, typically for the breakfast trade, it is necessary to take several factors into account to achieve the desired degree of doneness. The size of the egg and its temperature are critical since the temperature of the boiling water is basically fixed. Thus the experienced cook knows to cook a large or cold egg somewhat longer and a small or warm egg somewhat less than is usual. It is, of course, impossible to actually check the degree of doneness without opening the egg, so there is considerable opportunity to make a mistake that will not be detected before the egg is actually served.

OBJECTS OF THE INVENTION

It is therefore an object of the present invention to provide an improved method of soft-cooking an egg in the shell.

Another object is the provision of such an improved method of soft-cooking an egg in the shell which overcomes the above-given disadvantages, that is which allows a perfectly done soft-cooked egg to be prepared in an automatic procedure that will work with different eggs.

A further object is to provide an improved method of soft-cooking an egg that allows cooking time to be reduced.

SUMMARY OF THE INVENTION

A raw egg is cooked according to the invention by orienting the egg adjacent a field coil and electrically energizing the field coil with a high-frequency alternating electric current so as to inductive heating the egg. The current density in the egg will inherently decrease from the outside in, insuring that the egg will be perfectly cooked, with a firm white surrounding a warmed but still liquid or only slightly cooked yoke. Inductive heating works by generating eddy currents and heat in a conductive material by shifting a magnetic field through it.

The field coil according to the invention operates at between 1 MHz and 1000 MHz, preferably between 10 MHz and 50 MHz, and generates a field having parallel lines passing through the egg. According to the invention the coil and egg are relatively rotated, normally by holding the coil stationary and rotating the egg, while electrically energizing the field coil. The axis of rotation of the egg and the field lines extend orthogonally to one another. To this end the field coil has a pair of halves connected in series and flanking the egg.

More particularly according to the invention the field coil has two parts arranged to generate a pair of fields with the lines of one of the fields crossing the lines of the other field at the egg. The field lines of the two parts extend generally orthogonally to one another.

To further enhance the inductive cooking, hot water is poured over the egg while inductively heating it. More particularly the water is poured to start with at a great volume/time rate over the egg and while the coil is energized and after a predetermined interval the volume/time rate is substantially decreased. Between 150 ml and 450 ml of hot water is poured over the egg. In addition after ceasing energization of the coil the cold water is poured over the egg.

The egg according to the invention is held adjacent the coil in a removable plastic egg cup and is normally cooked by energization of the coil for between 1 min and 3 min, typically in 2 min. The method of this invention works faster than standard soft boiling.

BRIEF DESCRIPTION OF THE DRAWING

The above and other objects, features, and advantages will become more readily apparent from the following description, reference being made to the accompanying drawing in which.

SPECIFIC DESCRIPTION

Figure 1:
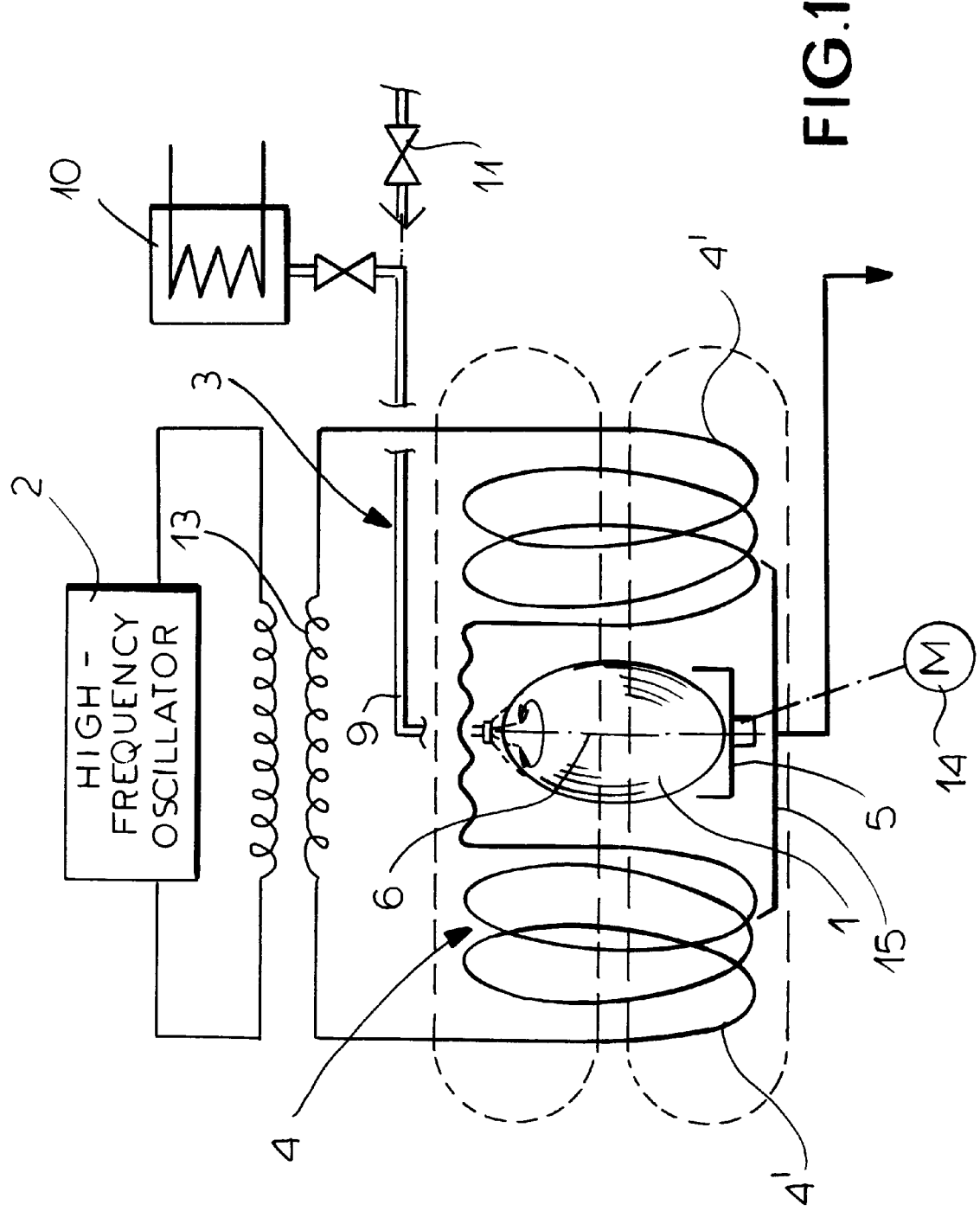
FIG. 1 is a schematic diagram illustrating an apparatus for carrying out the method of this invention.

As seen in FIG. 1 a raw egg is cooked inductively at high frequency. This is done with a high-frequency oscillator 2 connected via a transformer 13 to a field coil 4 having a pair of halves 4' that symmetrically flank the egg 1 and are in series with each other so as to produce an alternating magnetic field with parallel field lines. The coil halves 4' flank a plastic support 5, which can be a simple egg cup, that is rotated about an upright axis 6 of the egg 1 by a motor indicated schematically at 14.

Figure 2:
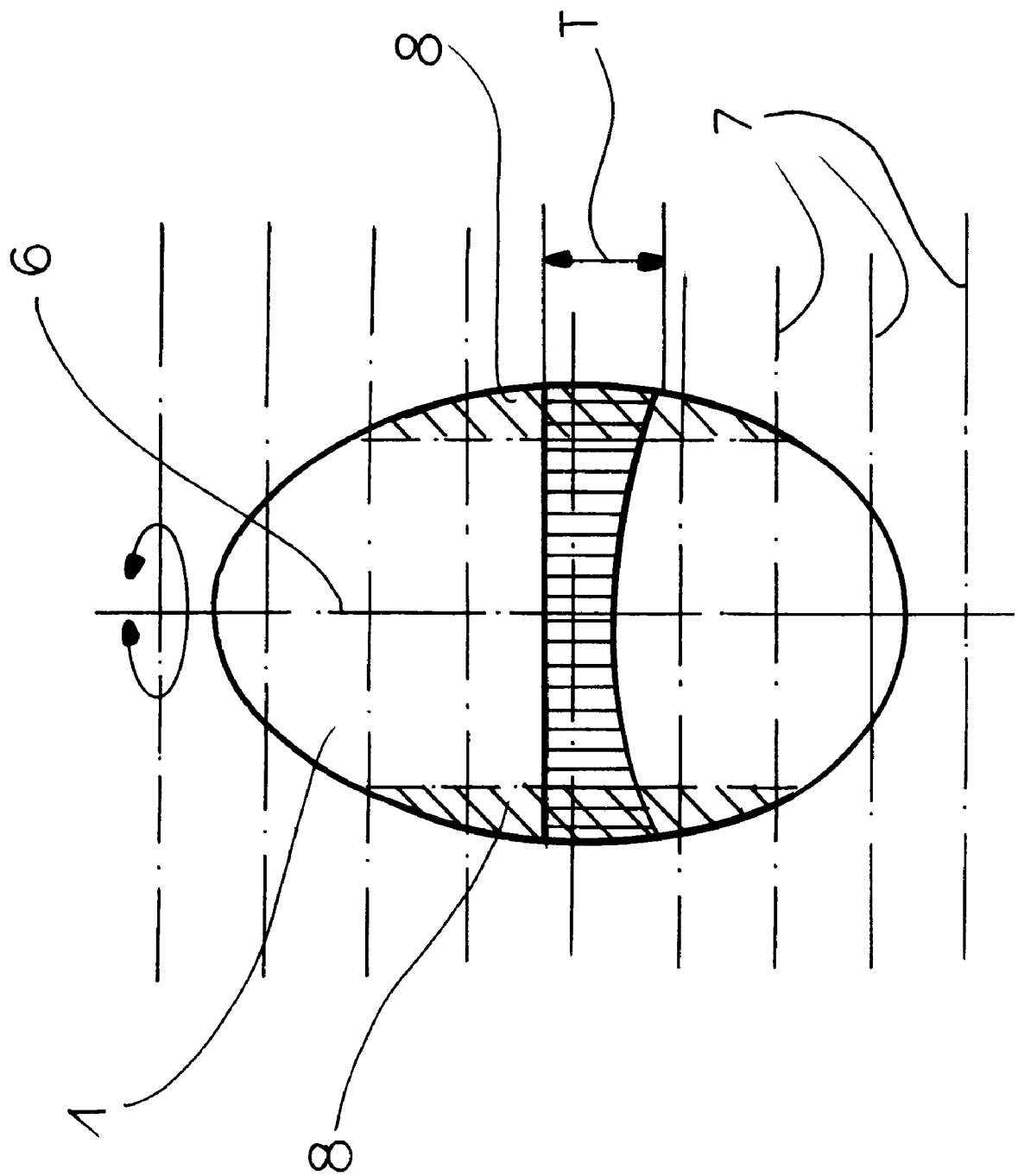
FIG. 2 is a diagram illustrating how the method of this invention works.

FIG. 2 shows parallel field lines 7 for the egg 1 which is rotated about its major axis which here is vertical and which is orthogonal to the field lines 7. The high-frequency electromagnetic field from the cylindrical coil halves 4 produces as indicated at T more heat in peripheral side regions 8 of the egg 1 so that they will cook more rapidly than the core of the egg 1. Of course instead of rotating the egg 1 in a stationary coil 4, the coil 4 could be rotated around a stationary egg 1.

In order to improve the cooking effect a nozzle 9 sprays hot water from a heater 11 over the egg, which water is caught underneath the egg at 15. The hot water is poured over the rotating egg for only the first portion of the cooking time. Normally 150 ml to 450 ml of hot water per egg is used. Once the egg is cooked, a cool-water valve 11 can be opened to pour cool water over the egg and prevent further cooking.

Figure 3:
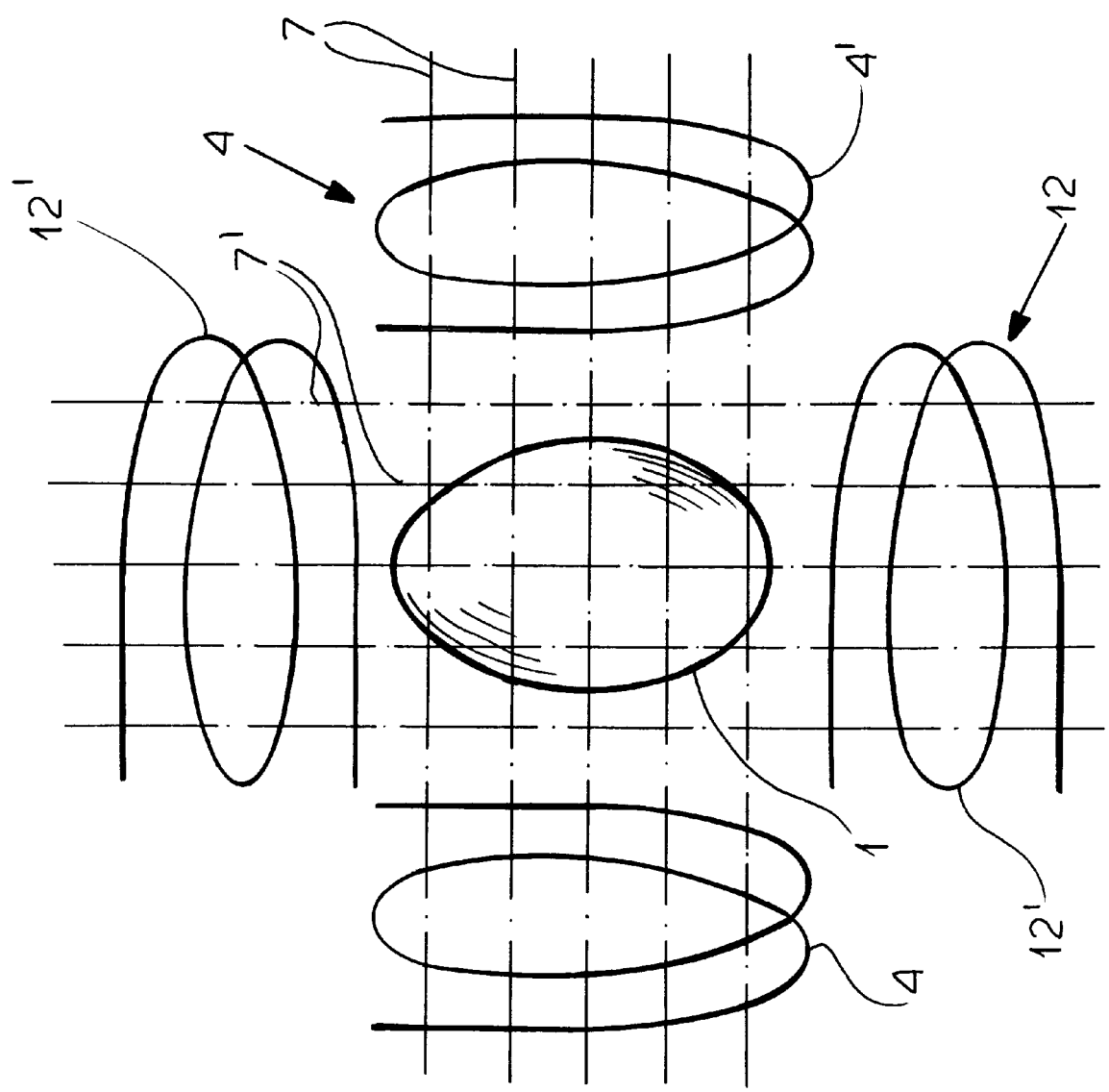
FIG. 3 is a diagram illustrating another method in accordance with the invention.

FIG. 3 shows an arrangement where, in addition to the coil halves 4' laterally flanking the egg 1, there is a further coil 12 with concentric helical halves 12' that form vertical field lines 7' through the egg 1. This ensures that the top and bottom of the egg 1 are also cooked.

For inductive cooking a frequency between 1 MHz and 1000 MHz, preferably between 10 MHz and 50 MHz is used. Here the frequency is 27 MHz. When smaller frequencies are used more current and/or greater inductivity in the field coils is needed with high voltage. Increasing the frequency creates shielding problems. Above 1000 MHz it is necessary to transmit the radiation through hollow metallic wave guides that have to be quite large and make the method impractical.

With the method of this invention working at 27 MHz at 400 Watt a standard chicken egg is perfectly soft cooked in 2 min. During the high-frequency heating about 300 ml of hot, nearly boiling, water is trickled over it. At the start the water is poured at a rate of about 750 ml/min and then slowed to about 130 ml/min. The resultant egg has a firm cooked white and a warm but still liquid yoke.

What is claimed is:

1. A method of cooking a raw egg, the method comprising the steps of:

orienting the egg adjacent a field coil;

electrically energizing the field coil with a high-frequency alternating electric current and thereby inductively heating the egg, and relatively rotating the coil and egg while electrically energizing the field coil.

2. The egg-cooking method defined in claim 1 wherein the egg is rotated about an axis and the field coil is stationary and generates field lines that are generally orthogonal to the axis.

3. The egg-cooking method defined in claim 1, further comprising the step of pouring hot water over the egg while inductively heating it.

4. The egg-cooking method defined in claim 3 wherein while the coil is energized the water is poured to start with at great volume/time rate over the egg and after a predetermined interval the volume/time rate is substantially decreased.

5. The egg-cooking method defined in claim 3 wherein between 150 ml and 450 ml of hot water is poured over the egg.

6. The egg-cooking method defined in claim 3, further comprising the steps of ceasing energization of the coil and pouring cold water over the egg.

7. The egg-cooking method defined in claim 1 wherein the egg is held adjacent the coil in a removable plastic egg cup.

8. The egg-cooking method defined in claim 1 wherein the coil is energized for between 1 min and 3 min.

9. A method of cooking a raw egg, the method comprising the steps of:

orienting the egg adjacent a field coil which has two parts arranged to generate a pair of fields with the lines of one of the fields crossing the lines of the other field at the egg; and electrically energizing the field coil with a high-frequency alternating electric current and thereby inductively heating the egg.

10. The egg-cooking method defined in claim 9 wherein the field lines of the two parts extend generally orthogonally to one another.

11. The egg-cooking method defined in claim 9, further comprising the step of pouring hot water over the egg while inductively heating it.

12. The egg-cooking method defined in claim 11 wherein while the coil is energized the water is poured to start with a great volume/time rate over the egg and after a predetermined interval the volume/time rate is substantially decreased.

13. The egg-cooking method defined in claim 11 wherein between 150 ml and 450 ml of hot water is poured over the egg.

14. The egg-cooking method defined in claim 11, further comprising the steps of ceasing energization of the coil and pouring cold water over the egg.

15. The egg-cooking method defined in claim 9 wherein the egg is held adjacent the coil in a removable plastic egg cup.

16. The egg-cooking method defined in claim 9 wherein the coil is energized for between 1 min and 3 min.

* * * * *